March 31, 1970 R. F. WHITE 3,504,113

VISUAL COORDINATING COMMUNICATION NETWORK

Filed March 6, 1967

INVENTOR
ROBERT F. WHITE
BY Stanley Wolder
ATTORNEY 3,504,113

VISUAL COORDINATING COMMUNICATION NETWORK

Robert F. White, New York, N.Y., assignor to TNT Communications Inc., New York, N.Y., a corporation of New York Filed Mar. 6, 1967, Ser. No. 620,700
Int. Cl. H04n 7/10, 7/18, 7/02
U.S. Cl. 178—6 12 Claims

ABSTRACT OF THE DISCLOSURE

A television transmitter, and a remote control network for generating a plurality of different pairs of audio frequency signals are located at a transmitter station and connected to a plurality of remote receiver stations. Located at each receiver station are three side by side screens, a television receiver projecting a picture on the middle screen, and a pair of automatic slide changing optical projectors focused on the side screens, the corresponding projectors at the receiver stations having the same slide sequences. Switch networks selectively responsive to respective signal pairs simultaneously control corresponding projectors at all receiver stations.

BACKGROUND OF THE INVENTION

The present invention relates generally to an improved communication system and it relates particularly to an improved network for remotely controlling the presentation of visual information.

Many procedures require for their effective practice the concurrent transmission of visual information to a plurality of remotely located areas. Among such procedures are multiple area conventions and conferences of various natures such as technical, sales and promotion, educational programs, auctions, military planning and coordination, and the like. Closed circuit television has been widely used in the above connection but this possesses important drawbacks and disadvantages. Conventional television transmission is of highly limited resolution and generally lacking in good color fidelity. Accordingly, where visual resolution or high color fidelity is required, the use of conventional transmission methods and procedures leave much to be desired and for many applications are unsatisfactory and unsuitable.

SUMMARY OF THE INVENTION

A principal object of the present invention is to provide an improved system for the communication of visual information.

Another object of the present invention is to provide an improved system for the communication of visual information to a plurality of spaced areas wherein the drawbacks of the lack of resolution and high color fidelity and other limitations of television transmission are at least in part overcome.

Still another object of the present invention is to provide an improved optical projection system to accompany and augment the television transmission of visual information and to overcome many of the limitations thereof.

In a sense the present invention contemplates the provision of a communication system comprising a transmitter station and a plurality of remotely spaced receiver stations, a multiple frame first optical projector located at each of said receiver stations and provided with an electrically responsive frame control mechanism means at said transmitter station for simultaneously transmitting a first electric control signal to each of said receiver stations, and means responsive to said control signal at said receiver stations for simultaneously actuating said frame controls.

According to a preferred form of the present system there is located at the transmitter station a television transmitter and means for selectively producing three different projector control signals, each comprising a different pair of audio frequency signals, said signal pairs being transmitted to the receiver stations. At each receiver station there are located a set of three side-by-side projection screens, a pair of electrically motivated automatic changing slide projectors focused on respective outer screens and a television projector focused on the middle screen. The corresponding projectors at the receiver stations are loaded with the same sets of slides arranged in the same sequence. The frame control actuating means are responsive to a first pair of signals for actuating the first projectors, to a second pair of signals for actuating the second projectors and to a third pair of signals for actuating all of the slide projectors.

By employing the present communication system many of the drawbacks and disadvantages accompanying the use of conventional television are overcome. Advantageously, current information is transmitted through the conventional television systems whereas that information requiring a high degree of resolution or color fidelity is presented by the remotely controlled slide projectors. For example, such information as maps, technical drawings, complex charts and diagrams, biological pictures and representations, pictures of works or objects of art, color representations, where resolution or color is important may be exhibited by the remotely controlled slide projectors thereby greatly augmenting the usefulness of television communication in many fields.

DESCRIPTION OF PREFERRED EMBODIMENT

Figure 1:
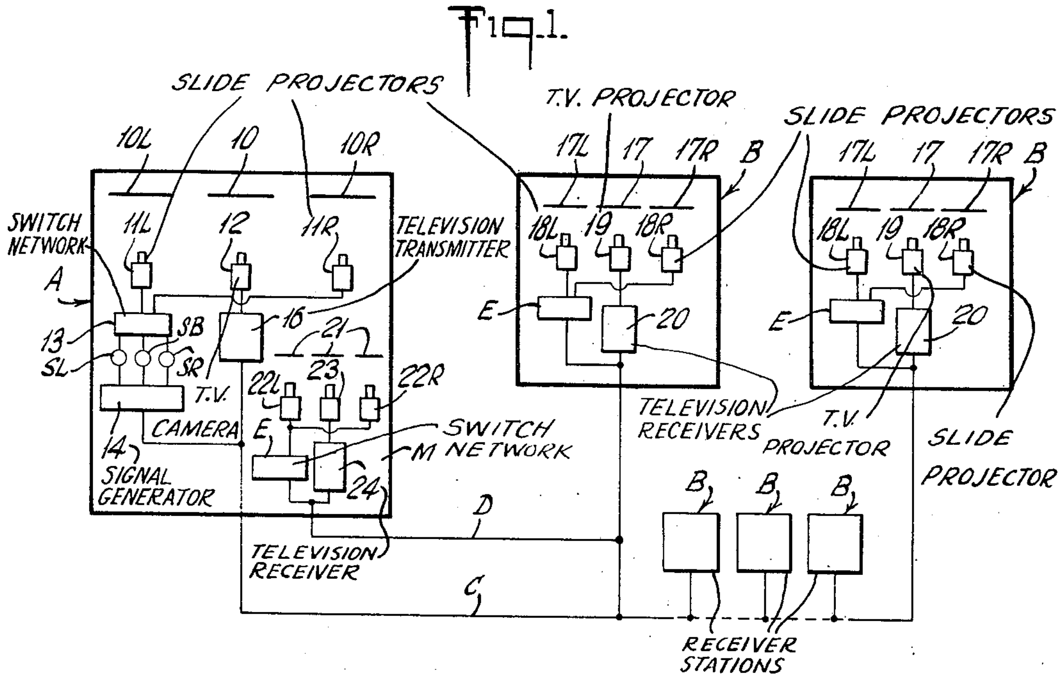
FIGURE 1 is a block diagram of a communication network embodying the present invention.

Referring now to the drawing which illustrates a preferred embodiment of the present invention, the reference letter A generally designates a transmitter station which is connected by one or more communication channels C to a plurality of remotely spaced receiver station B which may be located in different cities throughout an area to be covered. The communication channels C advantageously include a closed circuit television-band of a telephone cable and a narrow projector control signal band of a telephone line, for example, of a band width of about 3000 cycles which connects each of the receiver stations B to the transmitter station A. In addition, for monitoring purposes, projector control and television channels D connects one of the receiver stations B to the transmitter station A.

Located at the transmitter station A which may be a studio, auditorium, auction gallery, conference room or the like are a stage or television viewing area 10 flanked on opposite sides by right and left hand projection screens 10R and 10L respectively. A left hand suitably positioned automatic changer slide projector 11L is focused on the screen 10L and a right hand suitably positioned automatic changer slide projector 11R is focused on the screen 10R. A television camera 12 is focused on the stage or viewing area 10. The slide projectors 11R and 11L are of known construction in which a stack or cartridge of transparent slides are loaded, a successive slide from the stack or cartridge being automatically inserted into the projection area by the closing of a slide changer switch associated with the projector. The slide changer control lines of the projectors 11L and 11R are connected to the output of a switching network 13 which is controlled by a group of three normally open push button switches SL, SB and SR respectively, the closing of which respectively actuates the slide changer of projector 11L, 11L and 11R, and 11R in the manner hereinafter set forth. The switches SL, SB and SR are also connected to the input of a coded signal generator 14 of known construction which produces a different pair of concurrent audio frequency electrical signals upon the closing of corresponding switches SL, SB and SR. The signal generator 14 is advantageously a 401 type data transmitter available from the American Telephone and Telegraph Company. The output of the signal pair generator 14 is connected to the communication channel C. The television camera 12 together with an audio pickup network is connected to the input of a television transmitter network 16 the output of which is likewise connected to the channel C.

Located at each of the receiver stations B are a set of side by side projection screens 17L, 17 and 17R respectively, suitably positioned left hand and right hand automatic changer slide projectors 18L and 18R of a construction similar to slide projectors 11L and 11R are focused on the screens 17L and 17R. A television picture projector 19 of known construction is focused on the middle screen 17 and is connected to the output of a television receiver 20 whose input is connected to the channel C. The automatic changer control lines of the projectors 18L and 18R are connected to the output of a switch network E responsive to pairs of audio frequency signals, the control input to which is connected to the control signal section of the channel C.

A receiver station M is located at the transmitter station A for monitoring purposes and is connected by a separate communication channel D to the channel C at a remote receiver station B. Like the arrangement at the receiver stations B, the monitoring station M is provided with a set of three side by side screens, left hand and right hand projectors 22L and 22R connected by way of a switching control network E to the channel D and a television picture projector 23 connected through a television receiver 24 to the line D. The television receivers 20 and 24 have audio sections associated therewith in the usual manner.

Figure 2:
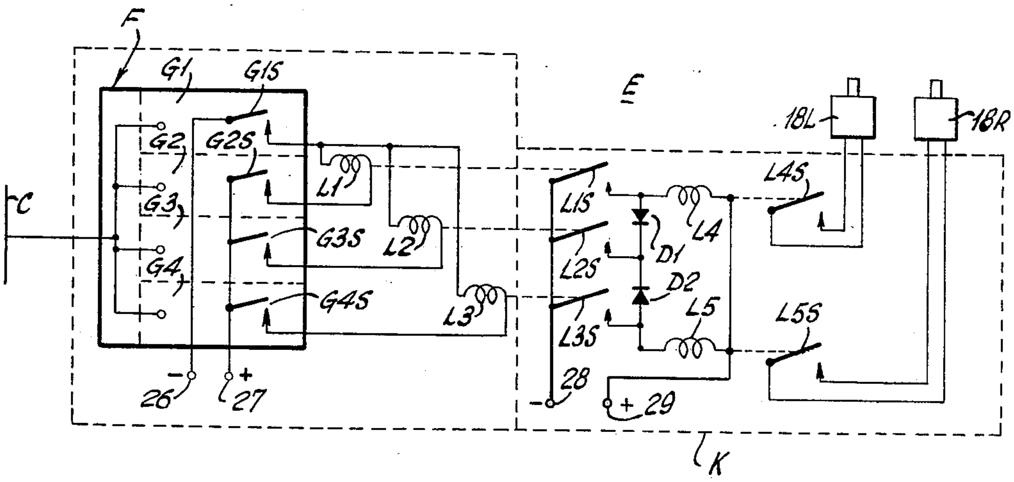
FIGURE 2 is a schematic view of the slide change control network forming part thereof.

The signal responsive switch network E is illustrated in FIGURE 2 and comprises a frequency responsive decoder or multifrequency date receiver network F which is advantageously of the 401J type DATA-PHONE receiver distributed by American Telephone and Telegraph Company. The receiver network F includes a plurality of circuits G1, G2, G3 and G4, here illustrated by way of example as four in number, each circuit having a differently turned filter network being responsive to a different audio frequency signal to close a corresponding normally open switch G1S, G2S, G3S and G4S. It should be noted that the signal generator 14 is so adjusted that upon the closing of switch SL a pair of audio signals is generated corresponding to those of circuits G1 and G2, the closing of switch SB generating a pair of audio signals corresponding to those of circuits G1 and G3 and the closing of switch SR generating a pair of audio signals corresponding to those of circuits G1 and G4 respectively, to close corresponding pairs of switches G1 and G2, G1 and G3, and G1 and G4.

Three relay solenoids L1, L2 and L3 are provided, the solenoid L1 having opposite terminals connected through switches G1S and G2S to opposite terminals 26 and 27 respectively of a source of current, the solenoid L2 having its opposite terminals connected through switches G1S and G3S to the terminals 26 and 27, and the solenoid L3 having its opposite terminals connected through switches G1S and G4S to the terminals 26 and 27. It should be noted that while the switches G1S to G4S are illustrated as mechanical switches they are advantageously solid state switches. Actuated by the solenoids L1, L2 and L3 are normally open relay switches L1S, L2S and L3S respectively, the arms of which are connected to the negative terminal 28 of a source of current having a positive terminal 29.

A relay solenoid L4 is connected between the stationary contact of the switch L1S and the positive terminal 29 and a relay solenoid L5 is connected between the stationary contact of switch L3S and the positive terminal 29. The stationary contacts of the switches L1S and L2S and connected by a diode D1 and the stationary contacts of the switches L2S and L3S are connected by a diode D2. The diodes D1 and D2 are arranged back to back so that the closure of switch L1S energizes only solenoid L4, the closing of switch L3S energizes only solenoid L5 and the closing of switch L2S energizes both solenoids L4 and L5. Actuated by the solenoid L4 is a normally open relay switch L4S the closing of which actuates the slide changer of the projector 18L for a single slide change sequence and actuated by the solenoid L5 is a normally open relay switch L5S the closing of which actuates the slide changer of the projector 18R for a single slide change sequence. It should be noted that the switching network 13 at the transmitter station A is advantageously similar to the section K of the network E including diodes D1 and D2, solenoids L4 and L5 and relay switches L4S and L5S, the switches L1S, L2S and L3S being substituted for by the hand actuated switches SL, SB and SR whereby closure of the switches SL, SB and SR actuate respectively the slide change mechanisms of projectors 11L, 11L and 11R, and 11R.

In the operation of the system described above the projectors 11L, 18L and 22L are loaded with identical sets of slides arranged in the same sequence and the projectors 11R, 18R and 22R are loaded with identical sets of slides arranged in the same sequence. The television picture viewed by the camera 12 and the accompanying sound are transmitted from the station A to the stations B where the televised pictures are projected on the screens 17 and the sound signals suitably tranduced in the known manner. An operator selectively actuates the switches SL, SB and SR to project the desired succesisve pictures on the screens 10L and 10R to accompany the performance, demonstration or instructions provided by the televised information. Concurrently with the actuation of a switch SL, SB or SR corresponding a pair of control signals are sent to the receiver stations B which is decoded by the networks E to simultaneously actuate the slide changers of the projectors 18L, 18R and 18L, or 18R corresponding to the slide changers of the projectors 11L, 11L and 11R, or 11R actuated at station A. Thus the slides projected on the screens 17L are the same as those on screen 10L and those projected on the screens 17R are the same as those on 10R. An attendant at the monitoring station M can check the proper operation and coordination of the system by observing the screens 21 and comparing them with the screens 10L, 10 and 10R.

While there has been described and illustrated a preferred embodiment of the present invention, it is apparent that numerous alterations, omissions and additions may be made without departing from the spirit thereof.

What is claimed is:

1. A communication system comprising a transmitter station and a plurality of receiver stations remotely spaced from each other and from said transmitter station, a first optical projector provided with a store of projectable information containing frame elements located at each of the said receiver stations and provided with an electrically responsive frame control mechanism for effecting the selection of a frame element from said store and its positioning for projection, means at said transmitter station for simultaneously transmitting a first electric control signal to each of said receiver stations, and means responsive to said control signal at said receiver stations for simultaneously actuating said frame control mechanisms.

2. The communication system of claim 1 wherein said control signal is at a predetermined audio frequency and said frame control mechanism actuating means is selectively responsive to said predetermined frequency.

3. The communication system of claim 1 wherein said control signal comprises a first pair of simultaneous audio signals of different predetermined frequencies and said frame control mechanism actuating means is selectively responsive to said pair of simultaneous signals of said predetermined frequencies.

4. The communication system of claim 1 including a second optical projector located at each of said receiver stations and provided with an electrically responsive frame control mechanism, means at said transmitter station for simultaneously transmitting a second electric control signal to each of said receiver stations, and means responsive to said second control signal at said receiver stations for simultaneously actuating said second projector frame control mechanisms.

5. The communication system of claim 1 comprising means at said transmitter station for simultaneously transmitting a television picture signal to each of said receiver stations and means at each of said receiver stations for receiving said television signal and producing a picture in accordance therewith.

6. The communiction system of claim 1 comprising means at said transmitter station for simultaneously transmitting a television picture signal to each of said receiver stations and means at each of said receiver stations for receiving said television signal and producing a picture in accordance therewith, and wherein said control signal comprises a first pair of simultaneous audio signals of different predetermined frequencies and said frame control actuating means is selectively responsive to said pair of simultaneous audio signals of said predetermined frequencies.

7. The communication system of claim 6 including a second optical projector located at each of said receiver stations and provided with an electrically responsive frame control mechanism, means at said transmitter station for simultaneously transmitting a second pair of simultaneous audio signals of predetermined frequencies different from said first pair to each of said receiver stations, and means selectively responsive to said second pair of signals for simultaneously actuating said second projector frame control mechanism.

8. The communication system of claim 6 including a second optical projector located at each of said receiver stations and provided with an electrically responsive frame control mechanism, means at said transmitter stations for simultaneously transmitting a second pair of simultaneous audio signals of predetermined frequencies different from said first pair to each of said receiver stations, and means at said transmitter station for simultaneously transmitting to said receiver stations a third pair of simultaneous audio signals of predetermined frequencies different from said first and second pairs, means selectively responsive to said second pair of signals for simultaneously actuating said second projector frame control mechanism and means selectively responsive to said third pair of signals for simultaneously actuating said first and second projector frame control mechanisms.

9. The communication system of claim 5 wherein said control signal transmission means includes telephone lines extending between said transmitter station and said receiver station.

10. The communication system of claim 5 including adjacent first and second screen areas, at each of said stations said optical projectors being focused on said first screen areas and means for focussing said television pictures on said second screen areas.

11. The communication system of claim 5 wherein said optical projectors are slide projectors provided with electrically motivated automatic slide changers.

12. The communication system of claim 1 comprising means at said transmitter station for simultaneously transmitting an electrical information signal to each of said receiver stations and means at each of said receiver stations for receiving said information signal and producing sensible information in accordance therewith.

References Cited

UNITED STATES PATENTS

| | | | |
|---|---|---|---|
| 2,222,606 | 11/1940 | Crook. | |
| 2,976,354 | 3/1961 | Banning. | |
| 3,328,803 | 6/1967 | Schwerin. | |
| 3,342,103 | 9/1967 | Fabrey | 353—107 |
| 3,381,276 | 4/1968 | James. | |

ROBERT L. GRIFFIN, Primary Examiner

H. W. BRITTON, Assistant Examiner

U.S. Cl. X.R.

35—8; 40—28.3; 353—105